United States Patent
Bao et al.

(10) Patent No.: US 9,401,658 B2
(45) Date of Patent: Jul. 26, 2016

(54) POWER SUPPLY APPARATUS AND METHOD OF GENERATING POWER BY THE SAME

(71) Applicant: Delta Electronics (Shanghai) Co., Ltd., Shanghai (CN)

(72) Inventors: Jian-Gang Bao, Shanghai (CN); Tie Chen, Shanghai (CN); Guo-Dong Yin, Shanghai (CN); Gang Chen, Shanghai (CN); Zhong-Wei Ke, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 281 days.

(21) Appl. No.: 14/183,535

(22) Filed: Feb. 19, 2014

(65) Prior Publication Data

US 2015/0155791 A1 Jun. 4, 2015

(30) Foreign Application Priority Data

Dec. 4, 2013 (CN) .......................... 2013 1 0647543

(51) Int. Cl.
*H02M 1/44* (2007.01)
*H02M 7/19* (2006.01)
*H02M 7/17* (2006.01)
*H02M 1/42* (2007.01)
*H02M 1/38* (2007.01)

(52) U.S. Cl.
CPC ........ *H02M 7/19* (2013.01); *H02M 7/17* (2013.01); *H02M 1/38* (2013.01); *H02M 1/4208* (2013.01); *H02M 1/44* (2013.01); *Y02B 70/126* (2013.01)

(58) Field of Classification Search
CPC ....... H02M 1/4208; H02M 1/44; H02M 1/38; H02M 7/17; H02M 7/19; H02M 3/33546
See application file for complete search history.

(56) References Cited

U.S. PATENT DOCUMENTS

| | | | | |
|---|---|---|---|---|
| 5,877,610 | A * | 3/1999 | Copple | H02M 3/1584 323/222 |
| 7,940,540 | B2 | 5/2011 | Vinciarelli | |
| 8,227,939 | B2 * | 7/2012 | Jacobson | H02M 3/28 307/82 |
| 2005/0286277 | A1 * | 12/2005 | Krein | H02J 1/102 363/65 |
| 2010/0127674 | A1 * | 5/2010 | Chang | H02M 3/28 323/273 |
| 2011/0109298 | A1 * | 5/2011 | Jones | H02M 7/493 323/361 |
| 2012/0119582 | A1 | 5/2012 | Tajima | |
| 2012/0212986 | A1 * | 8/2012 | Minami | H02M 1/4208 363/126 |
| 2012/0314465 | A1 * | 12/2012 | Matsui | H02J 5/005 363/71 |
| 2015/0280589 | A1 * | 10/2015 | Schekulin | H02H 7/1213 363/21.06 |

FOREIGN PATENT DOCUMENTS

| | | |
|---|---|---|
| CN | 102955487 A | 3/2013 |
| TW | 200703853 A | 1/2007 |
| WO | 2010/096682 A2 | 8/2010 |

* cited by examiner

*Primary Examiner* — Matthew Nguyen
(74) *Attorney, Agent, or Firm* — CKC & Partners Co., Ltd.

(57) ABSTRACT

A power supply apparatus includes a power source, power converters and an output connector. The power converters are configured for converting an input power from the power source into conversion powers. The output connector is configured for receiving the conversion powers from the power converters and outputting a parallel output power, a serial output power or separate output powers corresponding to the conversion powers from the power converters. A method of generating power by a power supply apparatus is also disclosed herein.

19 Claims, 16 Drawing Sheets

POWER SUPPLY APPARATUS AND METHOD OF GENERATING POWER BY THE SAME

RELATED APPLICATIONS

This application claims priority to China Application Serial Number 201310647543.8, filed Dec. 4, 2013 which is herein incorporated by reference.

BACKGROUND

1. Technical Field

The present disclosure relates to a power supply apparatus. More particularly, the present disclosure relates to a power supply apparatus for supplying various powers.

2. Description of Related Art

With advanced development of technology nowadays, more and more power applications are designed with high efficiency, high power density, high reliability, low cost, etc., and thus power products tend to become more and more complex; for example, there are different demands of output voltages for different output loads in different output ways inside a power system.

In addition, there are more and more requirements for shorter periods and lower costs of developing power products. Therefore, if one specific power supply used for providing an exclusive power is researched and developed, it cannot satisfy and is not sufficient for various power applications. Moreover, the specific power supply used for providing one kind of power would be utilized without flexibility, and they also cannot be adapted to different loads or different conditions.

Therefore, a heretofore unaddressed need exists in the art to address the aforementioned deficiencies and inadequacies.

SUMMARY

An aspect of the present disclosure is related to a power supply apparatus. The power supply apparatus includes a power source, a plurality of power converters and an output connector. The power converters are configured for converting an input power from the power source into conversion powers. The output connector is configured for receiving the conversion powers from the power converters and outputting a parallel output power, a serial output power or separate output powers corresponding to the conversion powers from the power converters.

Another aspect of the present disclosure is related to a power supply apparatus. The power supply apparatus includes a power source, a plurality of power converters and an output connector. The power converters are electrically connected to the power source. The output connector is configured for operatively connecting outputs of the power converters, such that the outputs of the power converters are electrically connected in parallel or in series, or the outputs of the power converters are separate from each other.

Still another aspect of the present disclosure is related to a method of generating power by a power supply apparatus. The method includes converting an input power from a power source into conversion powers by a plurality of power converters, respectively; and operatively connecting outputs of the power converters and outputting a parallel output power, a serial output power or separate output powers corresponding to the conversion powers from the power converters.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

Figure 1:
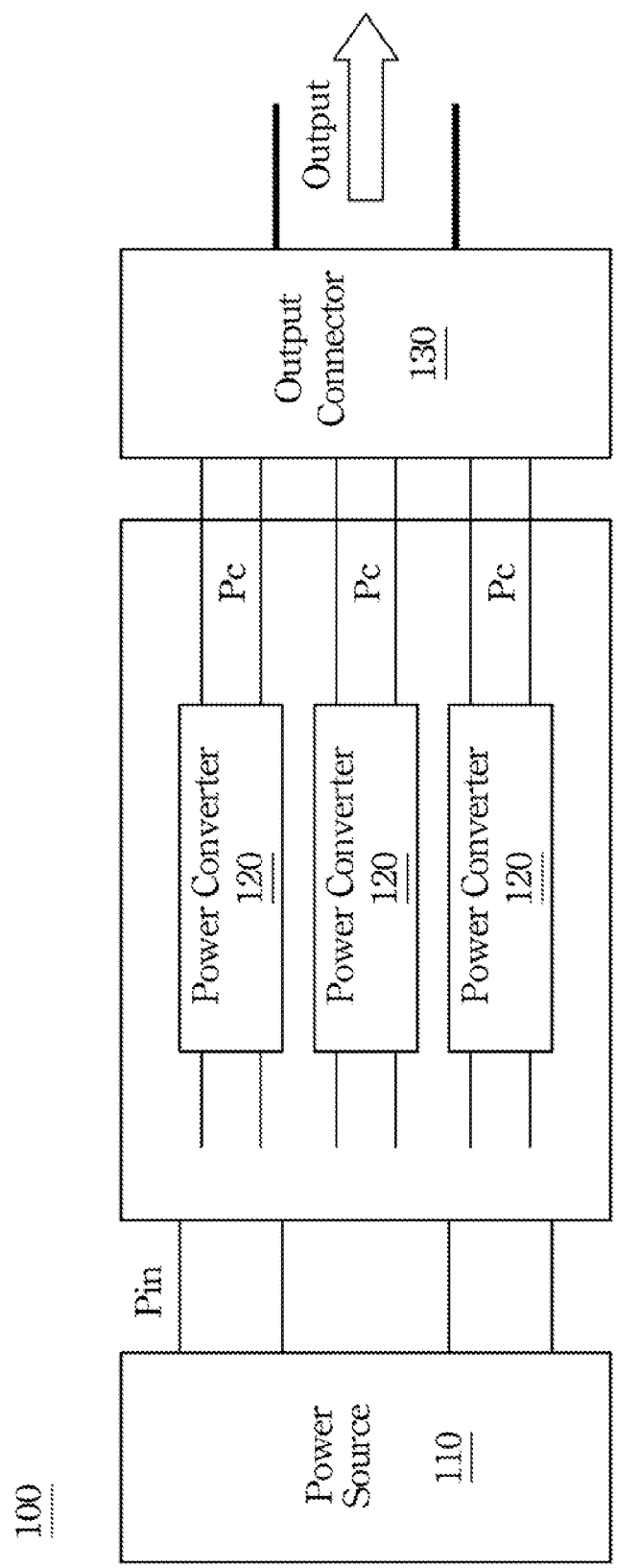
FIG. 1 is a schematic diagram of a power supply apparatus according to a first embodiment of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1 is a schematic diagram of a power supply apparatus according to a first embodiment of the present disclosure. As illustrated in FIG. 1, the power supply apparatus 100 includes a power source 110, a plurality of power converters 120 and an output connector 130. The power source 110 is configured for providing an input power Pin. The power converters 120 are configured for converting the input power Pin from the power source 110 into conversion powers Pc, respectively. The output connector 130 is configured for receiving the conversion powers Pc from the power converters 120 and outputting a parallel output power, a serial output power or separate output powers corresponding to the conversion powers Pc from the power converters 120.

For purposes of convenient illustration, only three power converters 120 are shown in FIG. 1; however, it is not intended to be limiting of the present disclosure, and persons of ordinary skill in the art can modify the number of the power converters 120 according to practical needs.

In another aspect, the power converters 120 are electrically connected to the power source 110, and the output connector 130 is configured for operatively connecting outputs of the power converters 120, such that the outputs of the power converters 120 are electrically connected in parallel or in series, or the outputs of the power converters 120 are separate from each other.

In one embodiment, the output connector 130 can be a parallel output connector, a serial output connector, a separate output connector, a partial-parallel and partial-separate output connector, a partial-serial and partial-separate output connector, a partial-parallel, partial-serial and partial-separate output connector, or a partial-parallel and partial-serial output connector.

Figure 2A:
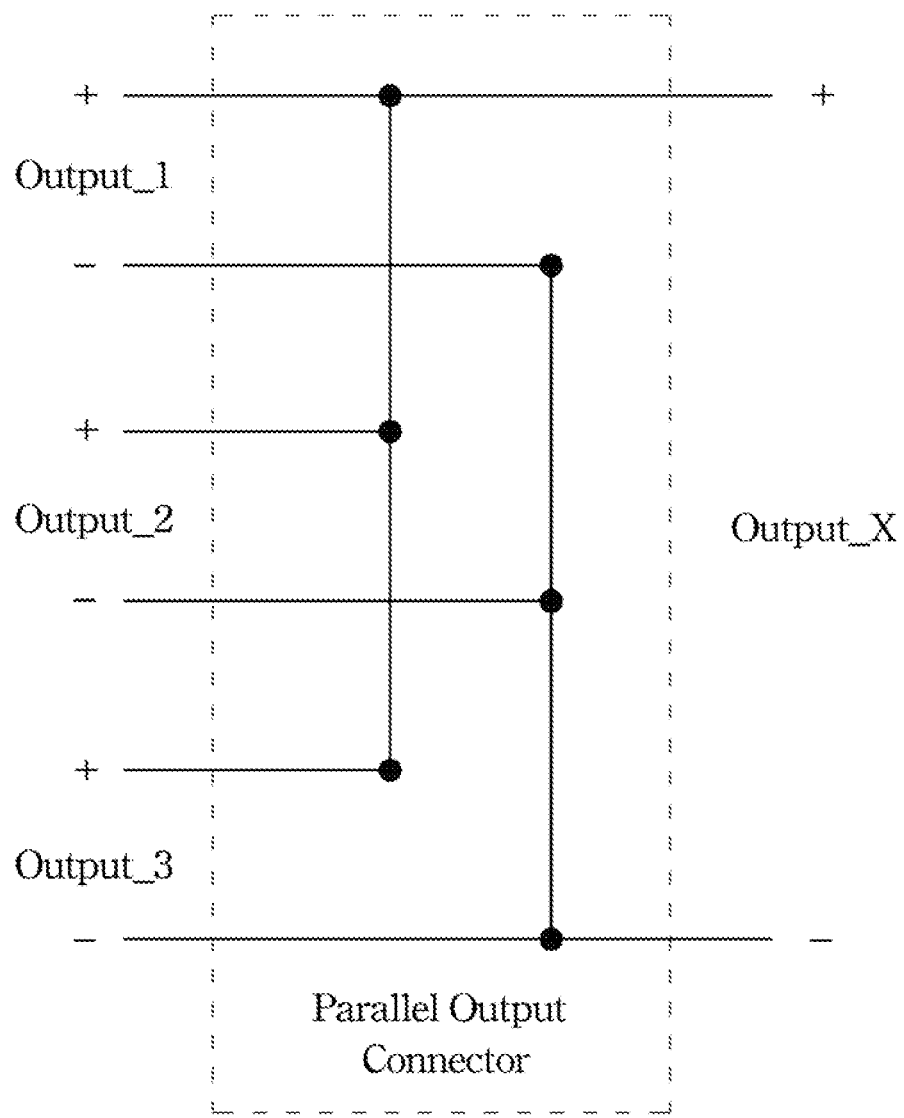
FIGS. 2A-2C are schematic diagrams illustrating the output connector connecting the outputs of the power converters by a parallel, serial and separate connection, respectively.
Figure 2B:
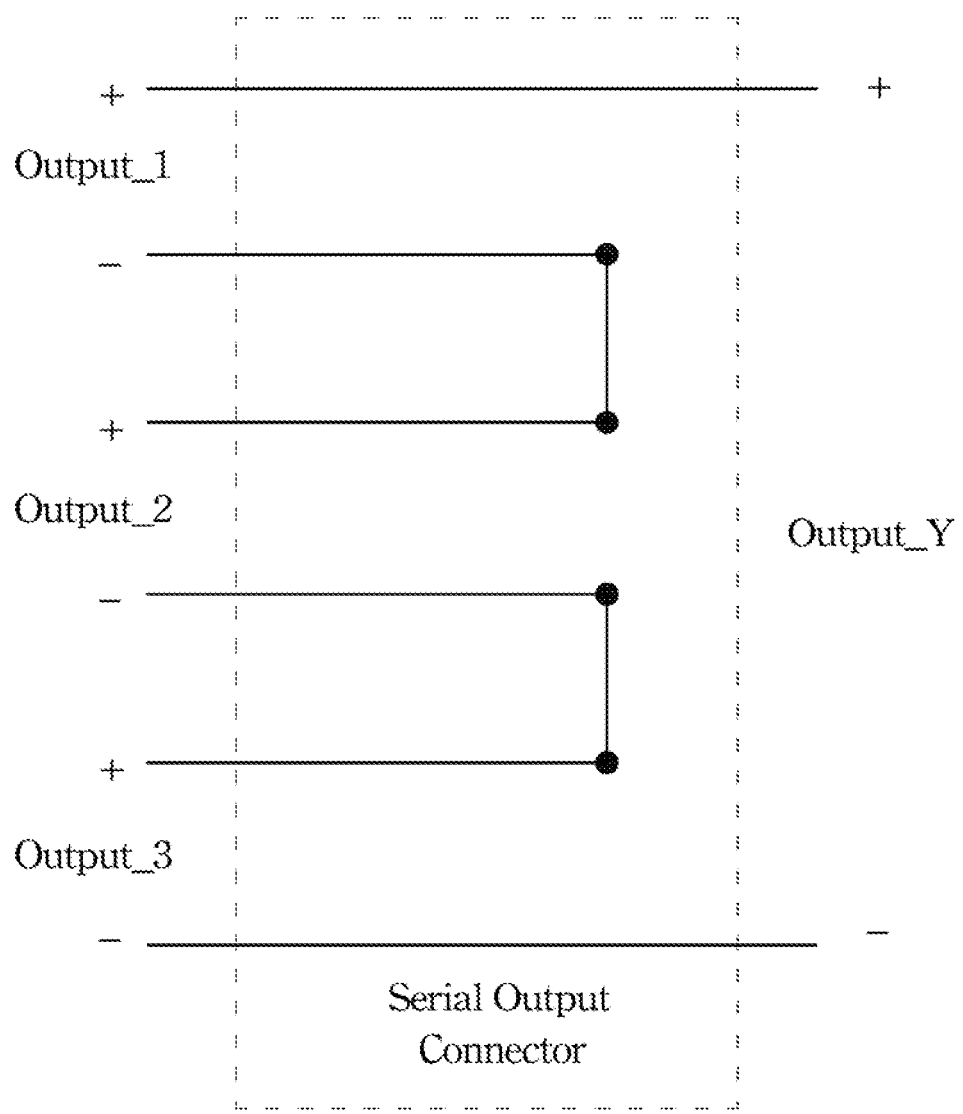
Figure 2C:
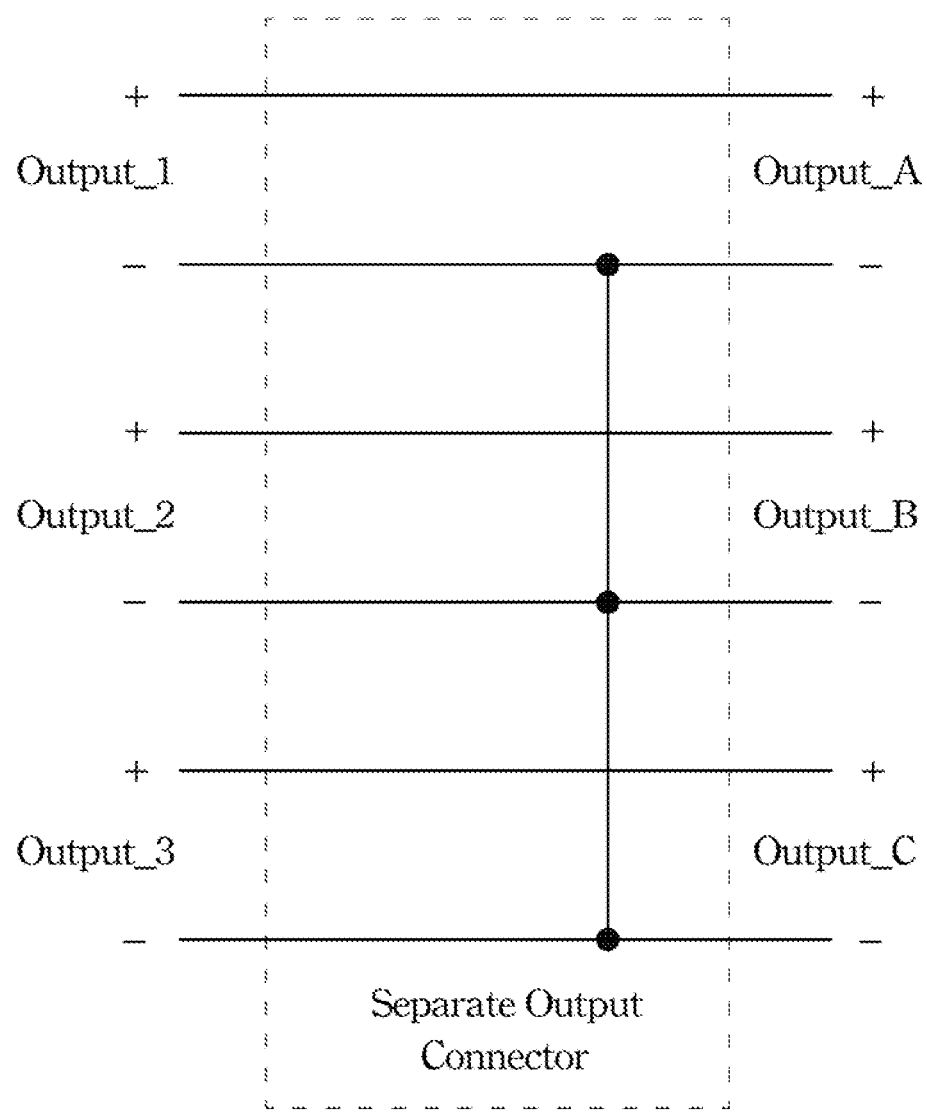

FIGS. 2A-2C are schematic diagrams illustrating the output connector connecting the outputs of the power converters by a parallel, serial and separate connection, respectively. FIGS. 2D-2G are schematic diagrams respectively illustrating the output connector connecting the outputs of the power converters by a combination of choosing at least two connection method of partial-parallel connection, partial-serial connection and partial-separate connection. For purposes of clear and convenient illustration, FIGS. 2A-2G are described below in conjunction with the embodiment shown in FIG. 1. As illustrated in FIGS. 2A-2G, Output_1, Output_2, Output_3, Output_4 and Output_5 can be referred to as the outputs of the power converters 120 (or can indicate the conversion powers Pc from the power converters 120).

In regard to the parallel output connection, as illustrated in FIG. 2A, the output connector 130 can be the parallel output connector for connecting Output_1, Output_2 and Output_3, such that Output_1, Output_2 and Output_3 are electrically connected in parallel and a parallel output power Output_X which is generated corresponding to the parallel connection of Output_1, Output_2 and Output_3 (or the parallel conversion powers) is outputted, in which the parallel output power Output_X is outputted with a larger output current due to the parallel output connection.

In regard to the serial output connection, as illustrated in FIG. 2B, the output connector 130 can be serial output connector for connecting Output_1, Output_2 and Output_3, such that Output_1, Output_2 and Output_3 are electrically connected in series and a serial output power Output_Y which is generated corresponding to the serial connection of Output_1, Output_2 and Output_3 (or the serial conversion powers) is outputted, in which the serial output power Output_Y is outputted with a larger output voltage due to the serial output connection.

In regard to the separate output connection, as illustrated in FIG. 2C, the output connector 130 can be the separate output connector for connecting Output_1, Output_2 and Output_3, such that Output_1, Output_2 and Output_3 are separate from each other and the separate output powers Output_A, Output_B and Output_C which are generated corresponding to the separate connection of Output_1, Output_2 and Output_3 (or the separate conversion powers) are outputted, in which the separate output powers Output_A, Output_B and Output_C can be outputted for various loads or power applications.

Figure 2D:
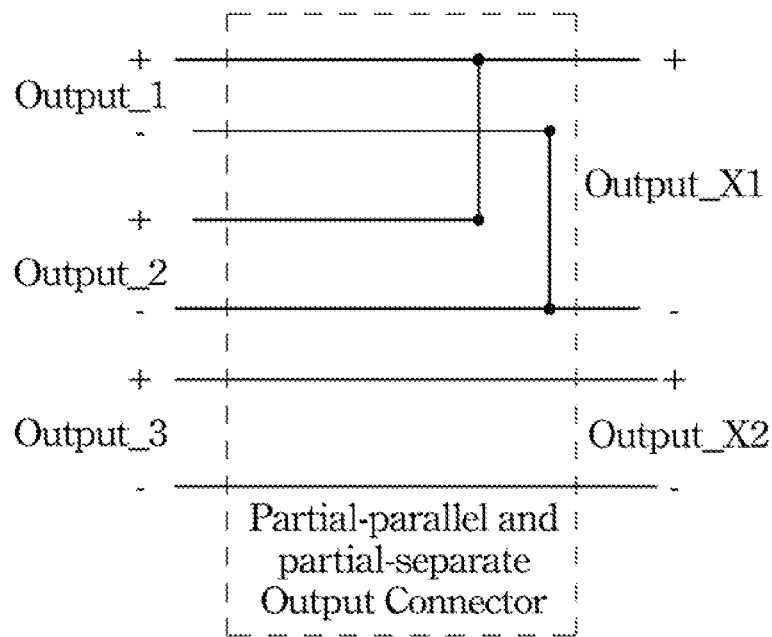
FIGS. 2D-2G are schematic diagrams respectively illustrating the output connector connecting the outputs of the power converters by a combination of choosing at least two connection method of partial-parallel connection, partial-serial connection and partial-separate connection.

In regard to the partial-parallel and partial-separate output connection, as illustrated in FIG. 2D, the output connector 130 can be the partial-parallel and partial-separate output connector for connecting Output_1, Output_2 and Output_3, such that Output_1, Output_2 are connected in parallel and a output power Output_X1 which is generated corresponding to the parallel connection of Output_1 and Output_2 is outputted, and Output_3 is separately outputted as a output power Output_X2, in which the parallel output power Output_X1 and the separate output power Output_X2 are outputted for various loads or power applications.

Figure 2E:
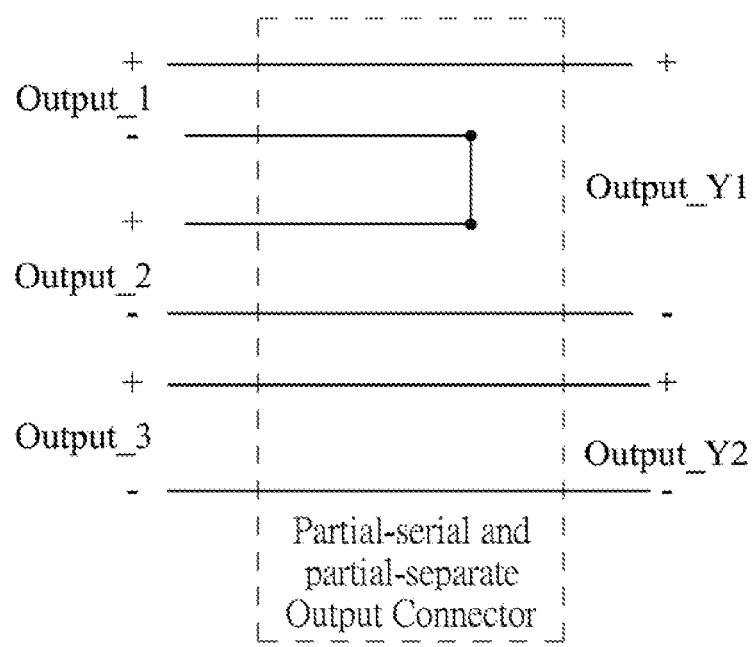

In regard to the partial-serial and partial-separate output connection, as illustrated in FIG. 2E, the output connector 130 can be the partial-serial and partial-separate output connector for connecting Output_1, Output_2 and Output_3, such that Output_1, Output_2 are connected in series and a output power Output_Y1 which is generated corresponding to the serial connection of Output_1 and Output_2 is outputted, and Output_3 is separately outputted as a output power Output_Y2, in which the serial output power Output_Y1 and the separate output power Output_Y2 are outputted for various loads or power applications.

Figure 2F:
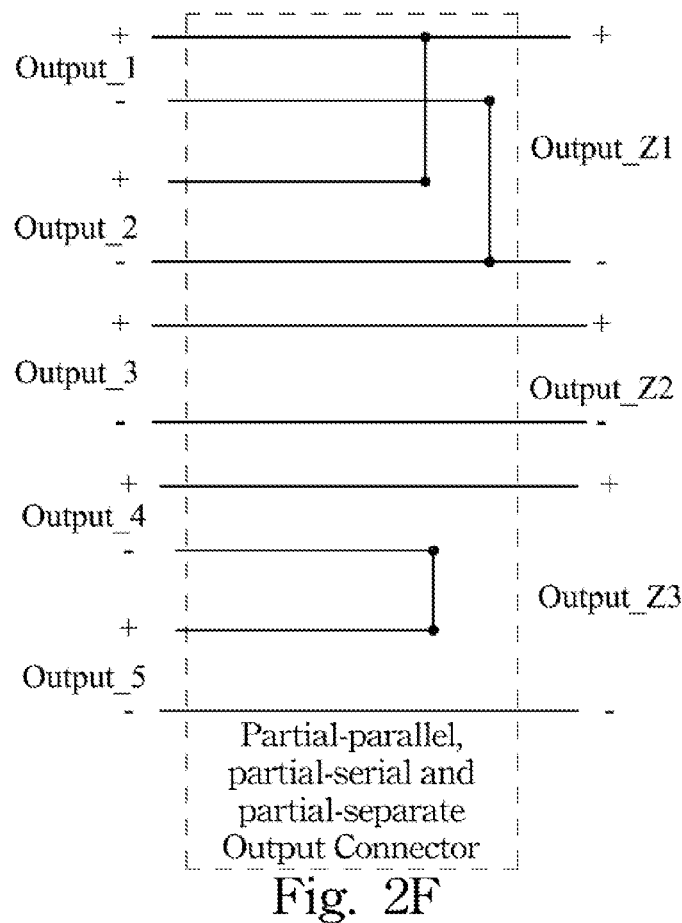

In regard to the partial-parallel, partial-serial and partial-separate output connection, as illustrated in FIG. 2F, the output connector 130 can be the partial-parallel, partial-serial and partial-separate output connector for connecting Output_1, Output_2, Output_3, Output_4 and Output_5, such that Output_1, Output_2 are connected in parallel and a output power Output_Z1 which is generated corresponding to the parallel connection of Output_1 and Output_2 is outputted, Output_3 is separately outputted as a output power Output_Z2, and Output_4, Output_5 are connected in series and a output power Output_Z3 which is generated corresponding to the serial connection of Output_4 and Output_5 is outputted, in which the parallel output power Output_Z1, the separate output power Output_Z2 and the serial output power Output_Z3 are outputted for various loads or power applications.

Figure 2G:
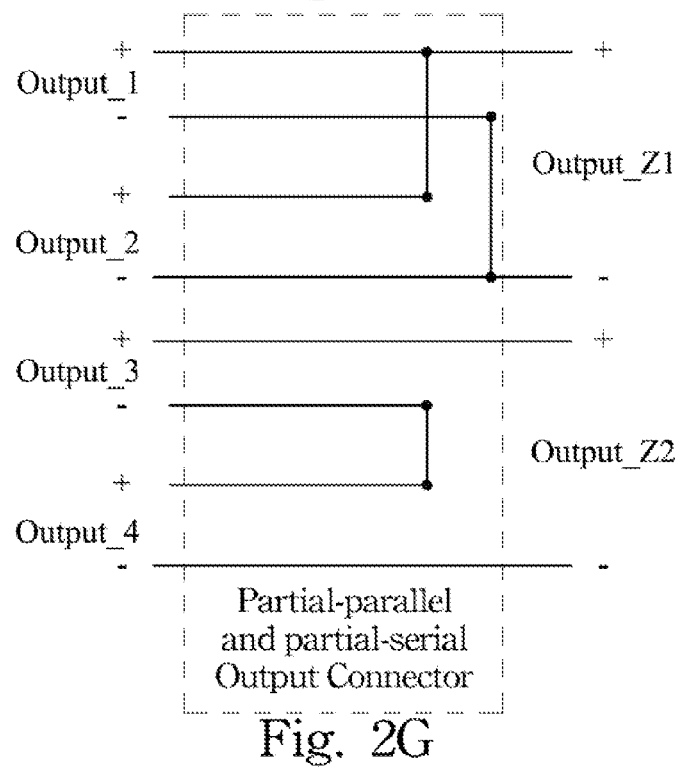

In regard to the partial-parallel and partial-serial output connection, as illustrated in FIG. 2G, the output connector 130 can be the partial-parallel and partial-serial output connector for connecting Output_1, Output_2, Output_3 and Output_4, such that Output_1, Output_2 are connected in parallel and a output power Output_Z1 which is generated corresponding to the parallel connection of Output_1 and Output_2 is outputted, and Output_3, Output_4 are connected in series and a output power Output_Z2 which is generated corresponding to the serial connection of Output_3 and Output_4 is outputted, in which the parallel output power Output_Z1 and the serial output power Output_Z2 are outputted for various loads or power applications. In FIG. 2D-2G, the ground of the output power Output_X1 and Output_X2, Output_Y1 and Output_Y2, Output_Z1, Output_Z2 and Output_Z3 are not connected to each other, but the ground of the above output powers can be connected to each other, the disclosure is not limited to the drawings.

The connection methods of the output connector in the embodiment are shown in FIG. 2A-2G, but the disclosure is not limited thereto. A person skilled in the art can adjust the connection method of the output connector according to actual demands.

As mentioned above, since the power supply apparatus 100 can be configured to operatively generate the output power with a larger output current or a larger output voltage, or to generate the separate output powers for various loads or power applications, the power supply apparatus 100 is able to provide various types of output powers suitable for various requirements of output, and thus the power supply apparatus 100 can satisfy various power applications, and the power supply apparatus 100 can be utilized with flexibility and adapted to various loads or various conditions as well.

Figure 3A:
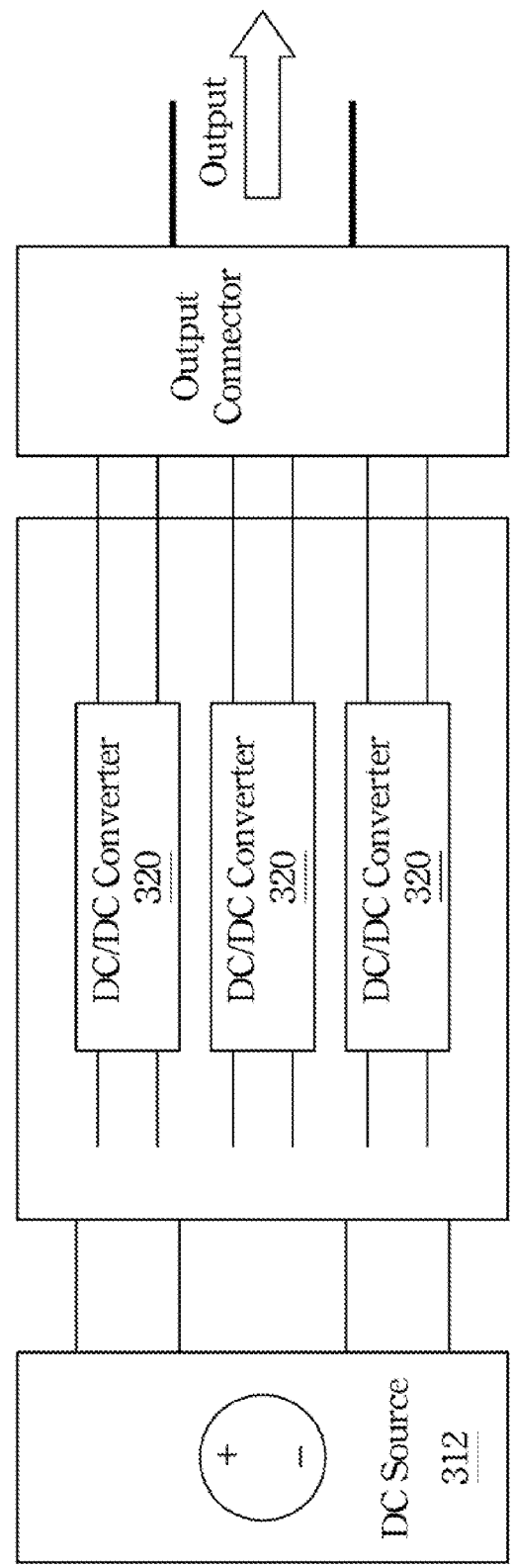
FIG. 3A is a schematic diagram of a power supply apparatus according to a second embodiment of the present disclosure.

FIG. 3A is a schematic diagram of a power supply apparatus according to a second embodiment of the present disclosure. In the present embodiment, the power source may further include a direct-current (DC) power source 310, and the DC power source 310 is configured for providing a DC power for the power converters. Moreover, in another embodiment, at least one of the power converters may further include a DC/DC converter 320 and the DC/DC converter 320 is configured for converting the DC power into the corresponding conversion power. For example, in the embodiment shown in FIG. 3A, each of the power converters includes the DC/DC converter 320.

In practice, the DC power source 310 can be configured by a single DC power source or multiple separate DC power sources.

Figure 3B:
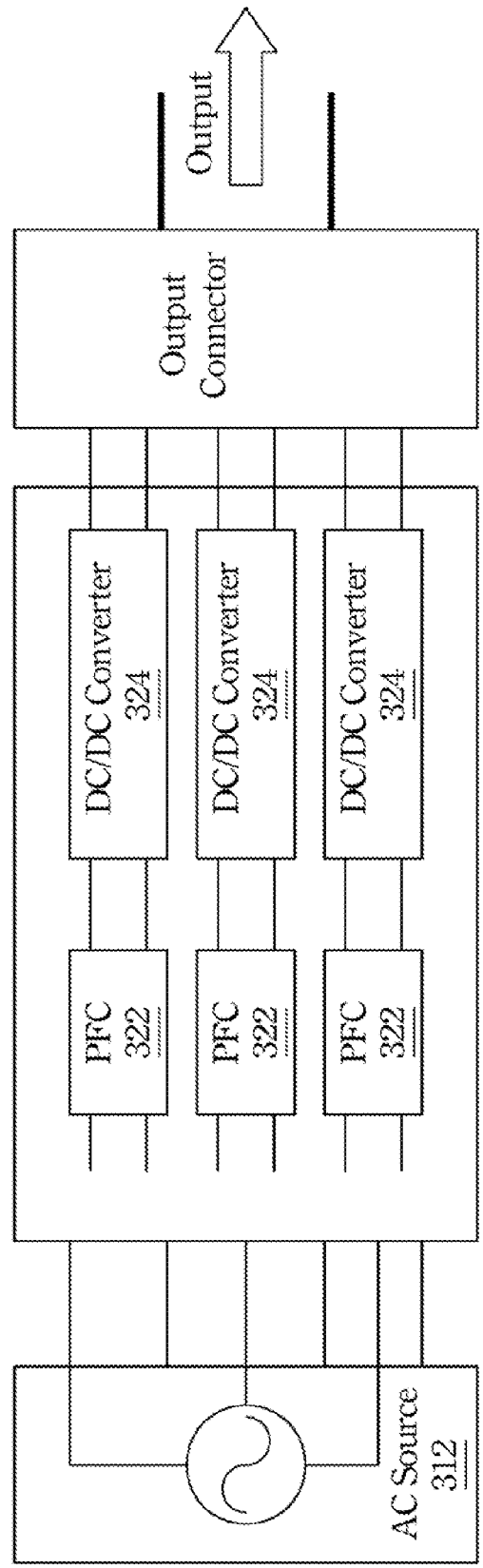
FIG. 3B is a schematic diagram of a power supply apparatus according to a third embodiment of the present disclosure.

FIG. 3B is a schematic diagram of a power supply apparatus according to a third embodiment of the present disclosure. In the present embodiment, the power source may further include an alternating-current (AC) power source 312, and the AC power source 312 is configured for providing an AC power for the power converters. Moreover, in another embodiment, at least one of the power converters may further include a power factor correction (PFC) circuit 322 and a DC/DC converter 324, in which the PFC circuit 322 is configured for receiving the AC power and outputting a DC power and the DC/DC converter 324 is configured for converting the DC power into the corresponding conversion power. For example, in the embodiment shown in FIG. 3B, each of the power converters includes the PFC circuit 322 and the DC/DC converter 324.

In practice, the AC power source 312 can be configured by a single-phase power source or a multi-phase power source (e.g., a three-phase power source with delta configuration or Y configuration).

Figure 4:
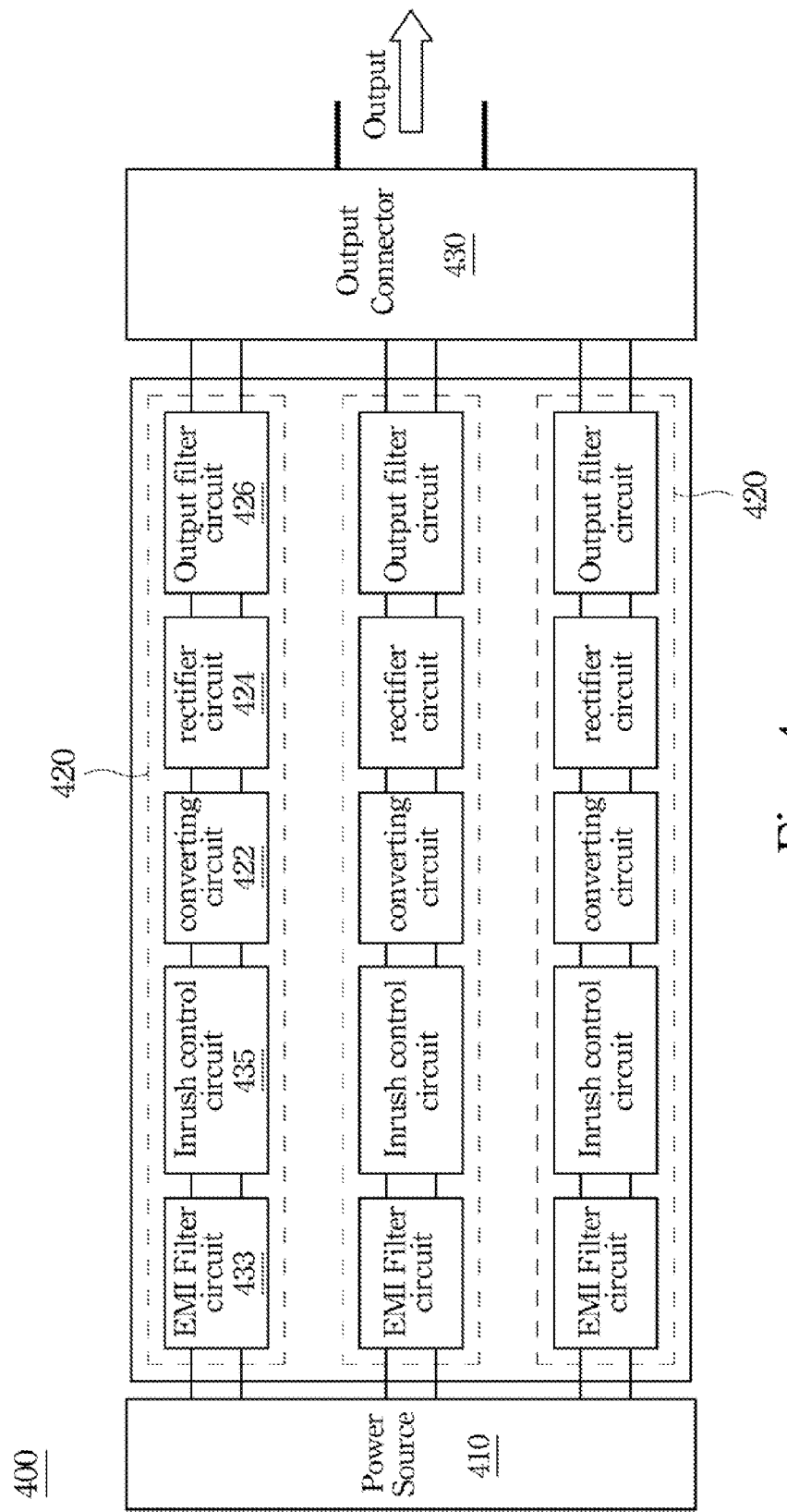
FIG. 4 is a schematic diagram of a power supply apparatus according to a fourth embodiment of the present disclosure.

FIG. 4 is a schematic diagram of a power supply apparatus according to a fourth embodiment of the present disclosure. As illustrated in FIG. 4, the power supply apparatus 400 includes a power source 410, power converters 420 and an output connector 430, in which the connections and operations of the power source 410, the power converter 420 and the output connector 430 are similar to those illustrated in the embodiment of FIG. 1, and thus they are not further detailed herein. Furthermore, at least one of the power converters 420 may further include a converting circuit 422, a rectifier circuit 424 and an output filter circuit 426. The converting circuit 422 is electrically connected to the power source 410 and configured for converting an input voltage corresponding to the input power from the power source 410 into a conversion voltage, for example the converting circuit 422 can be a phase shifted full bridge (PSFB) converter. The rectifier circuit 424 is configured for rectifying the conversion voltage, for example the rectifier circuit 424 can be a synchronous rectifier. The output filter circuit 426 is electrically connected across an output of the corresponding power converter 420, and configured for filtering the rectified conversion voltage from the rectifier circuit 424 and generating an output voltage.

In another embodiment, at least one of the power converters 420 may further include an EMI filter circuit 433 and an inrush control circuit 435. The EMI filter circuit 433 may be configured at the previous stage of the power converter 420 and configured for filtering electromagnetic interference from the input power generated from the power source 410. The inrush control circuit 435 may be configured between the EMI filter circuit 433 and the converting circuit 422 and configured for limiting excessive current inrush to the input power when the power converter 420 is powered on.

In yet another embodiment, each of the power converters 420 includes the EMI filter circuit 433, the inrush control circuit 435, the converting circuit 422, the rectifier circuit 424, and the output filter circuit 426, the connections and operations of which are illustrated above and shown in FIG. 4.

Figure 5:
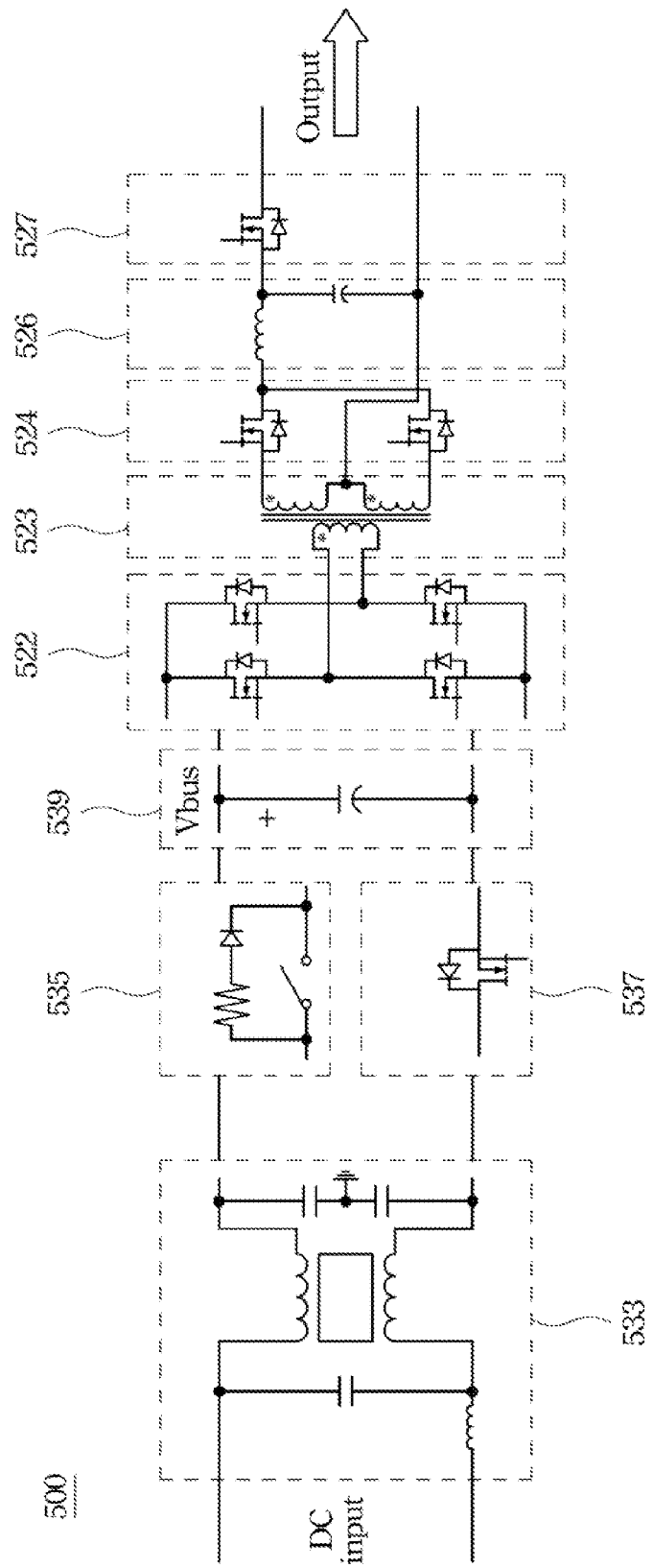
FIG. 5 is a circuit diagram of a DC/DC converter according to one embodiment of the present disclosure.

FIG. 5 is a circuit diagram of a DC/DC converter according to one embodiment of the present disclosure. The DC/DC converter 500 is configured with a single input and a single output. The DC/DC converter 500 can be applied in, but not limited to, the power converter in the embodiments of the present disclosure. For illustration, the DC/DC converter 500 is applied in the power converter 420 shown in FIG. 4. The DC/DC converter 500 includes an EMI filter 533, an inrush current control circuit 535, a reverse protection circuit 537, a capacitor unit 539, a phase shifted full bridge (PSFB) converter 522, an isolation stage (e.g., a transformer) 523, a synchronous rectifier (SR) 524, an output filter circuit 526, and an ORing circuit 527.

The EMI filter 533 can be configured for suppressing common-mode and differential-mode interference of the input power such that electromagnetic interference (EMI) standard can be met. The inrush current control circuit 535 can be configured for limiting instantaneous excessive current when the DC/DC converter 500 is powered on, in order to avoid misoperation. The reverse protection circuit 537 can be configured for protecting devices inside the power supply apparatus from being damaged if the input is inversely configured. The capacitor unit 539 may include a bulk capacitor and can be configured for storing energy corresponding to the input power and generating the input voltage provided for the converting circuit (e.g., the phase shifted full bridge converter 522), such that the requirement of hold-up time for the power supply apparatus can be satisfied. The PSFB converter 522 can be used as a DC/DC converter in large power applications and to increase efficiency significantly and also generates the conversion voltage delivered through the isolation stage 523 to the synchronous rectifier 524. The synchronous rectifier 524 includes MOSFETs configured for rectifying the conversion voltage so as to reduce conduction loss in ON state. The output filter circuit 526 can be configured for filtering the rectified conversion voltage from the synchronous rectifier 524. The ORing circuit 527 is configured for hot-swap and hot-plug when multiple redundant power applications are realized. Hot-swap and hot-plug are terms used interchangeably to refer to the process of safely inserting or removing cards, PC boards, cables, etc. In addition, other circuits such as a sampling circuit, a protection circuit, a communication circuit, an internal auxiliary power supplying circuit, etc., can be included in the power supply apparatus as well.

As for the configuration of the DC/DC converter 500, it can be applied in each of the power converters 420 shown in FIG. 4, and the outputs of multiple DC/DC converters 500 can be electrically connected in parallel or in series, or can be separate from each other or can be combinations of the above connection method, by the output connector 430.

However, for larger power applications, particularly the application requiring a larger output current, the DC/DC converters 500 may not start up normally if the outputs of the multiple DC/DC converters 500 are connected in series since the DC/DC converters 500 are independent from each other and there could be errors between parameters of internal control circuits of the independent DC/DC converters 500, such that the start-up time of the DC/DC converters 500 cannot be identical; in other words, the start-up time of the DC/DC converters 500 may be different from each other and thus the DC/DC converters 500 could be started up one after the other, such that the power supply apparatus may operate abnormally. The aforementioned condition is exemplarily described below.

Figure 6:
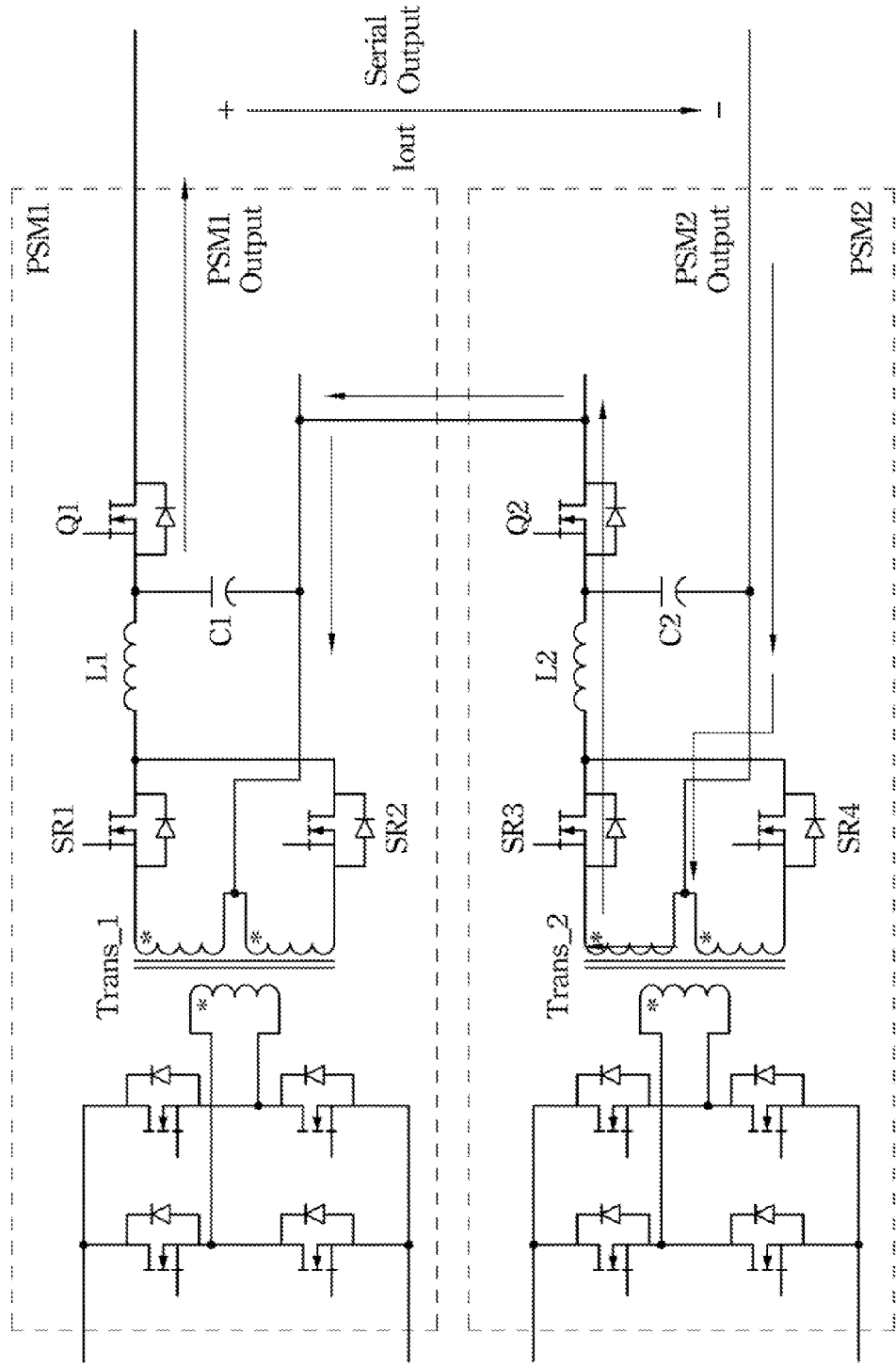
FIG. 6 is a schematic diagram illustrating a condition of outputs of two power converters being connected in series according to one embodiment of the present disclosure.

FIG. 6 is a schematic diagram illustrating a condition of outputs of two power converters being connected in series according to one embodiment of the present disclosure. As illustrated in FIG. 6, the power converters PSM1 and PSM2 may have a same portion of configurations as that shown in FIG. 5, and the outputs of the power converters PSM1 and PSM2 are connected in series. For example, after PSM1 is started up, the internal load current indicated by arrows shown in FIG. 6, is generated flowing from PSM2 to PSM1, and the external load current Iout flows from the positive output of PSM1 to the negative output of PSM2. Specifically, the internal load current in PSM2 flows sequentially through the secondary winding of the transformer Trans_2, the body diode of MOSFET SR3, the output filtering inductor L2, and the body diode of MOSFET Q2, toward the negative output of PSM1, in which voltage drops are generated across the devices (particularly the diodes) through which the load current flows. As a result, there will be a reverse voltage (or a negative voltage) generated across two terminals of the output capacitor C2 in PSM2, and the reverse voltage across the output capacitor C2 is increased along with the increase of the load current. Furthermore, when the voltage pulse is delivered from the primary winding of the transformer Trans_2, the secondary winding of the transformer Trans_2 is equivalent of being operated with the reverse voltage, such that the output power from PSM2 cannot be normally generated (i.e., PSM2 cannot be started up), and PSM2 is more difficult to be started up when the load is increased.

Figure 7:
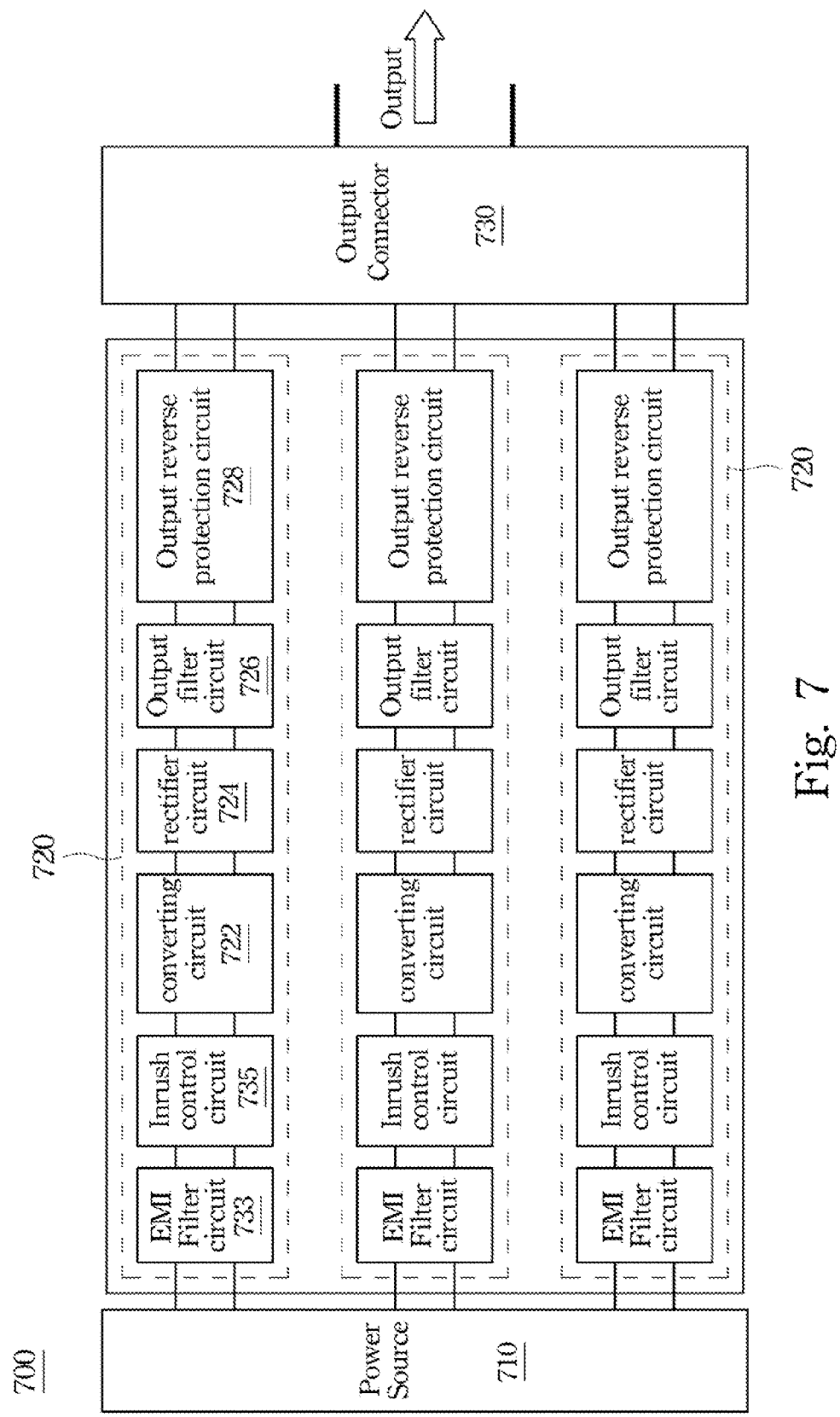
FIG. 7 is a schematic diagram of a power supply apparatus according to a fifth embodiment of the present disclosure.

An approach to the aforementioned issue is provided hereinafter. FIG. 7 is a schematic diagram of a power supply apparatus according to a fifth embodiment of the present disclosure. Similar to the embodiment illustrated in FIG. 4, the power supply apparatus 700 in the present embodiment also includes a power source 710, power converters 720 and an output connector 730, and at least one of the power converters 720 may further include a converting circuit 722, a rectifier circuit 724 and an output filter circuit 726, in which the connections and operations of the aforementioned devices are similar to those illustrated in the embodiment of FIG. 4, and thus they are not further detailed herein.

Compared to FIG. 4, at least one of the power converters 720 may further include an output reverse protection circuit 728 configured for clamping the output (or output voltage) of the output filter circuit 726 (i.e., clamping the output of the power converter 720) to an operation voltage (e.g., the voltage of 0 V) in the condition of the output filter circuit 726 generating the reverse voltage (or negative voltage). Therefore, if the output voltage becomes the reverse voltage due to the outputs connected in series, as described above, the output voltage which is the reverse voltage can be temporarily clamped to the operation voltage such that the reverse voltage has a minimum effect (or even no effect) upon the start-up of the power converter 720, and the normal output powers of the series-connected power converters 720 can thus be generated (i.e., the series-connected power converters 720 can thus be operated normally).

In one embodiment, at least one of the power converters 720 may further include and an EMI filter circuit 733 and an inrush control circuit 735, in which the connections and operations of the EMI filter circuit 733 and the inrush control circuit 735 are similar to those illustrated in the embodiment of FIG. 4.

In another embodiment, each of the power converters 720 includes the EMI filter circuit 733, the inrush control circuit 735, the converting circuit 722, the rectifier circuit 724, the output filter circuit 726, and the output reverse protection circuit 728, the connections and operations of which are illustrated above and shown in FIG. 7.

In still another embodiment, the output reverse protection circuit 728 may further include a diode device or a transistor device, in which the diode device or the transistor device is electrically connected across the output of the output filter circuit 726. For example, when the load current required for the output load is smaller, the diode device can be implemented in the output reverse protection circuit 728; when the load current required for the output load is larger, the transistor device can be implemented in the output reverse protection circuit 728. In practice, the transistor device can be implemented by MOSFET or other types of transistors according to practical needs.

Figure 8:
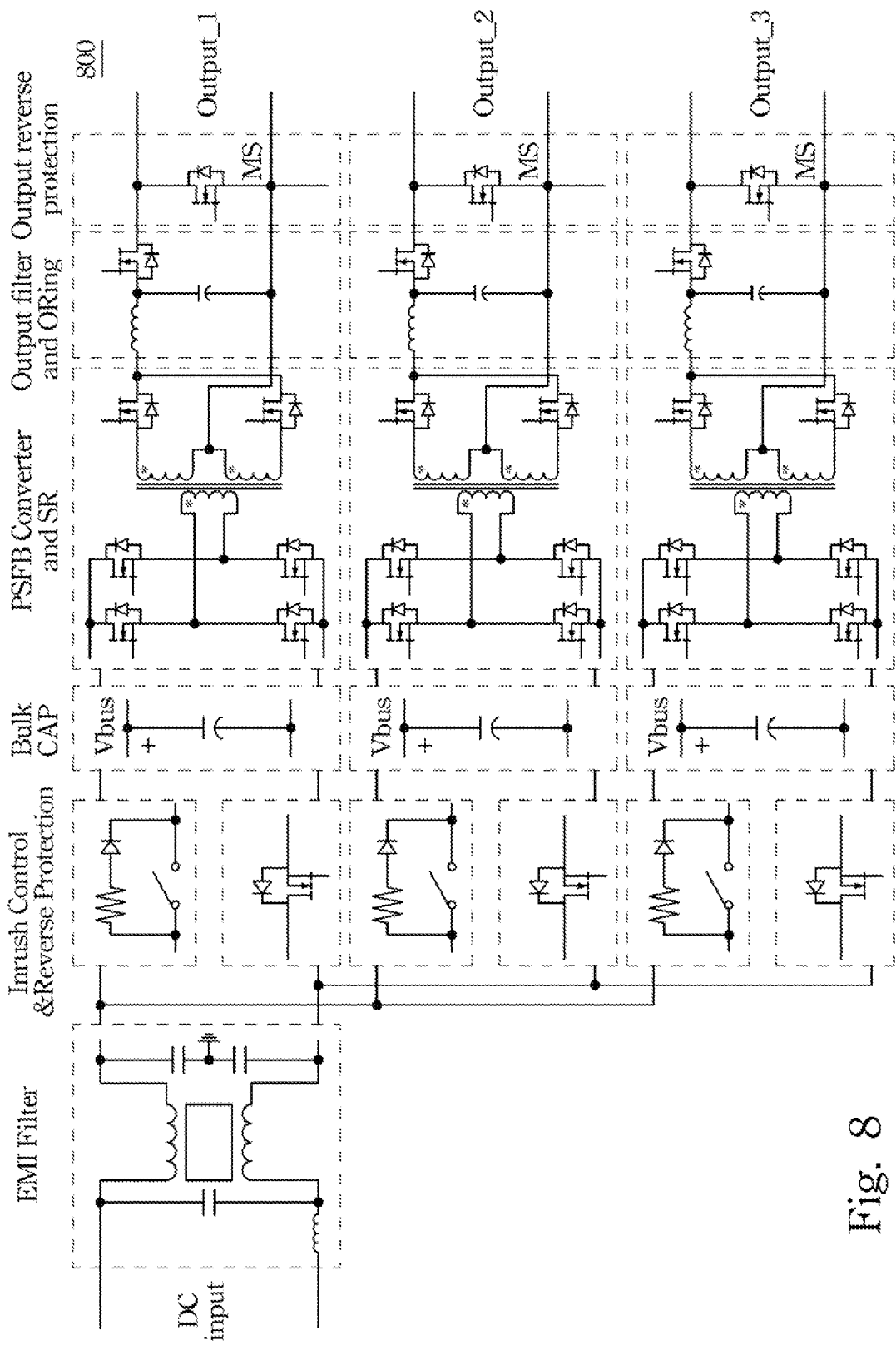
FIG. 8 is a schematic diagram of a power supply apparatus according to a sixth embodiment of the present disclosure.

FIG. 8 is a schematic diagram of a power supply apparatus according to a sixth embodiment of the present disclosure. In the present embodiment, the output reverse protection circuit includes a transistor (e.g., MOSFET) MS, two terminals of which are electrically connected across the output of the output filter circuit (or the output of the power converter), in which the transistor MS is operatively switched on to clamp the output voltage generated by the output filter circuit.

On the other hand, the input and output configurations of the power supply apparatuses illustrated in FIG. 4 and FIG. 7 can be modified according to practical needs. As illustrated in FIG. 8, the power supply apparatus 800 has one input (e.g., DC input) and three outputs Output_1, Output_2 and Output_3, and the outputs of power converters (e.g., DC/DC converters) in the power supply apparatus 800 are configured with a serial-parallel connection. Specifically, the power supply apparatus 800 includes one EMI filter for receiving the DC input, and the EMI filter is electrically connected in series to multiple groups (e.g., three groups as shown in FIG. 8) of circuits that are electrically connected in parallel with each other, in which each of the groups includes similar circuits illustrated in FIG. 5. The power supply apparatus 800 as shown in FIG. 8 is similar to that including three separate DC/DC converters or three independent power supply modules, in which other circuits such as the sampling circuit, the protection circuit, the communication circuit, the internal auxiliary power supplying circuit, etc., can be independently included in each of the DC/DC converters or power supply modules.

Notably, the number of input(s) and output(s) in the present embodiment is merely for purposes of illustration and not intended to be limiting of the present disclosure. For example, there can be two independent DC inputs, and thus there can be two EMI filters configured for separately receiving the DC inputs and similar circuits following the two EMI filters.

Figure 9:
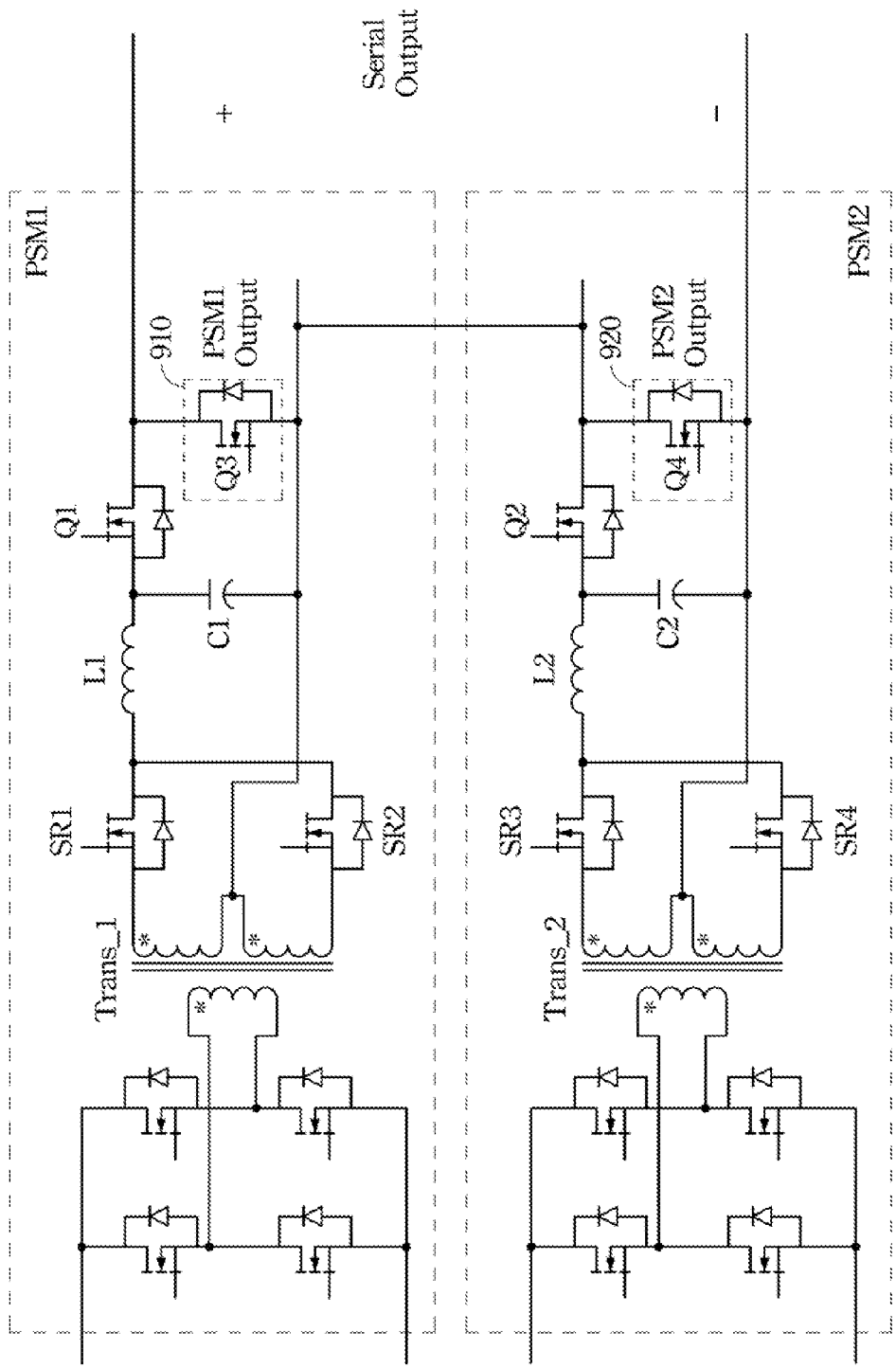
FIG. 9 is a schematic diagram illustrating a condition of outputs of two power converters being connected in series according to another embodiment of the present disclosure.

FIG. 9 is a schematic diagram illustrating a condition of outputs of two power converters being connected in series according to another embodiment of the present disclosure. The power converters PSM1 and PSM2 are illustrated schematically and fragmentarily in FIG. 9, and thus it is not limiting of the present disclosure. Compared to FIG. 6, the power converter PSM1 further includes an output reverse protection circuit 910, and the power converter PSM2 further includes an output reverse protection circuit 920, in which the output reverse protection circuit 910 further includes a transistor device Q3 electrically connected across the output of the output filter circuit (including the inductor L1 and the capacitor C1) or the output of PSM1, and the output reverse protection circuit 920 further includes a transistor device Q4 electrically connected across the output of the output filter circuit (including the inductor L2 and the capacitor C2) or the output of PSM2.

In operation, in the condition of a reverse voltage (or a negative voltage) generated across two terminals of the output capacitor C2 in PSM2, the transistor device Q4 is switched on to clamp the reverse voltage to an operation voltage; that is, the transistor device Q4 is switched on such that the output of the power converter PSM2 (i.e., PSM2 Output) is short-circuited, and as a result, the output voltage is temporarily clamped to a zero voltage and the voltage pulse can be normally delivered from the primary winding of the transformer Trans_2 to the secondary winding of the transformer Trans_2, and the normal output power of PSM2 can be generated accordingly.

Figure 10:
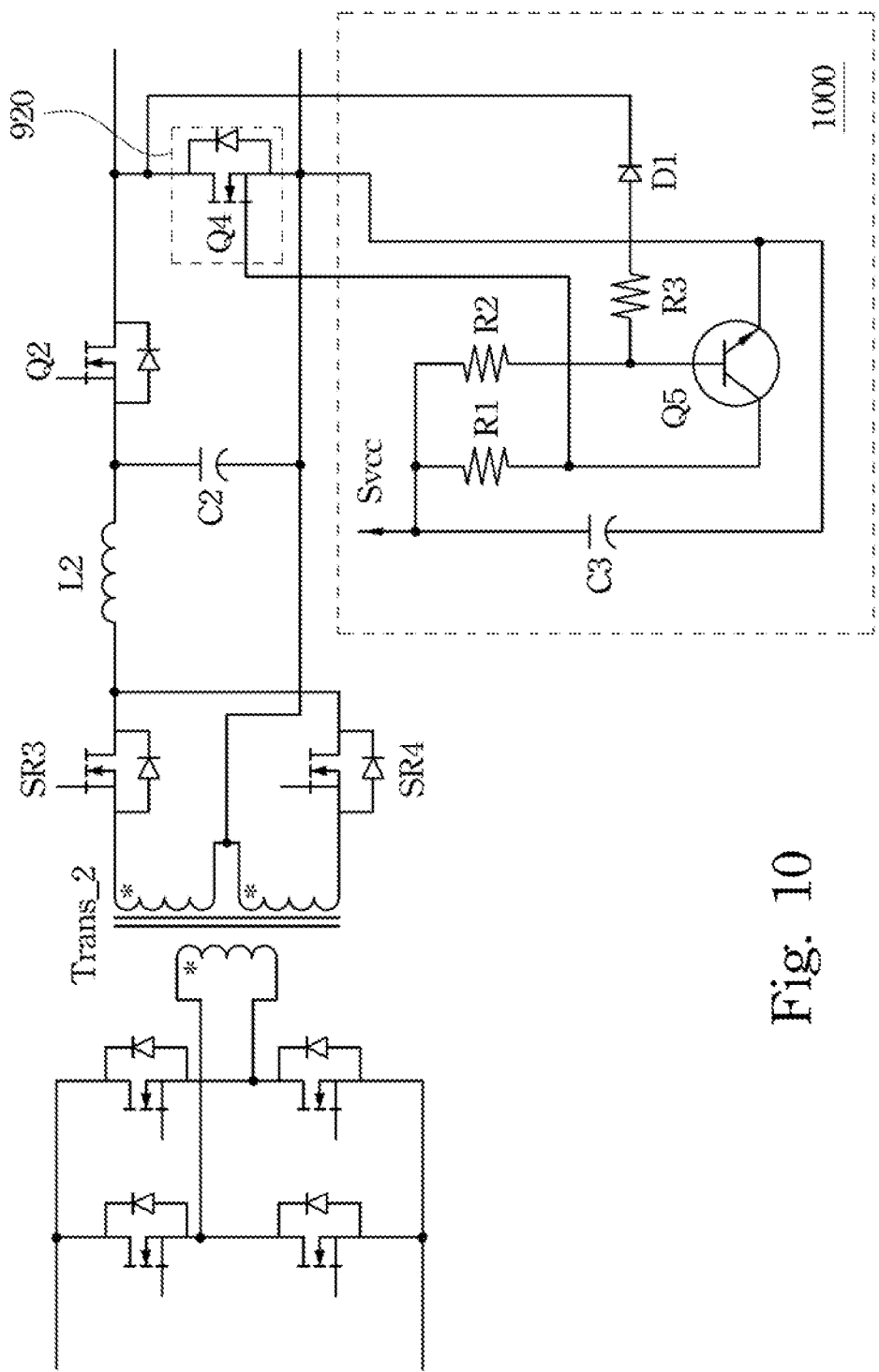
FIG. 10 is a schematic diagram illustrating a control mechanism of controlling one of the series-connected power converters shown in FIG. 9, according to one embodiment of the present disclosure.

FIG. 10 is a schematic diagram illustrating a control mechanism of controlling one of the series-connected power converters shown in FIG. 9, according to one embodiment of the present disclosure. FIG. 10 is illustrated schematically and fragmentarily, thus it is not limiting of the present disclosure. As illustrated FIG. 10, the power supply apparatus may further include a control circuit 1000 configured for activating the output reverse protection circuit 920 in response to the reverse voltage. Specifically, when the output reverse protection circuit 920 includes the transistor device Q4 as shown in FIG. 10, the control circuit 1000 is configured for switching on the transistor device Q4 in response to the reverse voltage.

In one embodiment, the control circuit 1000 may further include a transistor device Q5, and the transistor device Q5 is configured to receive a driving voltage Svcc from a driving source and to be switched off in response to the reverse voltage, for example, generated by the capacitor C2 as described above, such that the output reverse protection circuit 920 is activated by the driving voltage Svcc to clamp the output voltage (e.g., Vc) to the operation voltage.

In another embodiment, as illustrated FIG. 10, the transistor device Q5 has a first terminal, a second terminal and a control terminal, in which the first terminal of the transistor device Q5 is electrically connected to the control terminal of the transistor device Q4 and electrically connected through a resistor R1 to the driving source providing the driving voltage Svcc, the second terminal of the transistor device Q5 is electrically connected to the first terminal of the transistor device Q4 and electrically connected through a capacitor C3 to the driving source providing the driving voltage Svcc, and the control terminal is electrically connected through a resistor R3 and a diode D1 to the second terminal of the transistor device Q4 and electrically connected through a resistor R2 to the driving source providing the driving voltage Svcc.

For purposes of convenient illustration, the control mechanism in the present embodiment is described in conjunction with the embodiment in FIG. 9. In operation, when PSM1 and PSM2 are started up at different time (for example, PSM2 is delayed to be started up), the voltage Vc across the capacitor C2 (or the output voltage of PSM2) becomes the reverse voltage (or negative voltage). At that moment, the transistor device Q5 is switched off such that the driving voltage Svcc drives the transistor device Q4 to switch on, and thus the voltage Vc across the capacitor C2 (or the output voltage of PSM2) is clamped to a zero voltage; that is, the output of PSM2 (i.e., PSM2 Output) is short-circuited, such that the voltage pulse can be normally delivered from the primary winding of the transformer Trans_2 to the secondary winding of the transformer Trans_2. When the voltage Vc across the capacitor C2 increases to be larger than 0 V, the transistor device Q5 is switched on, such that the transistor device Q4 is switched off, and thus and the normal output voltage (or output power) of PSM2 can be generated accordingly.

Figure 11:
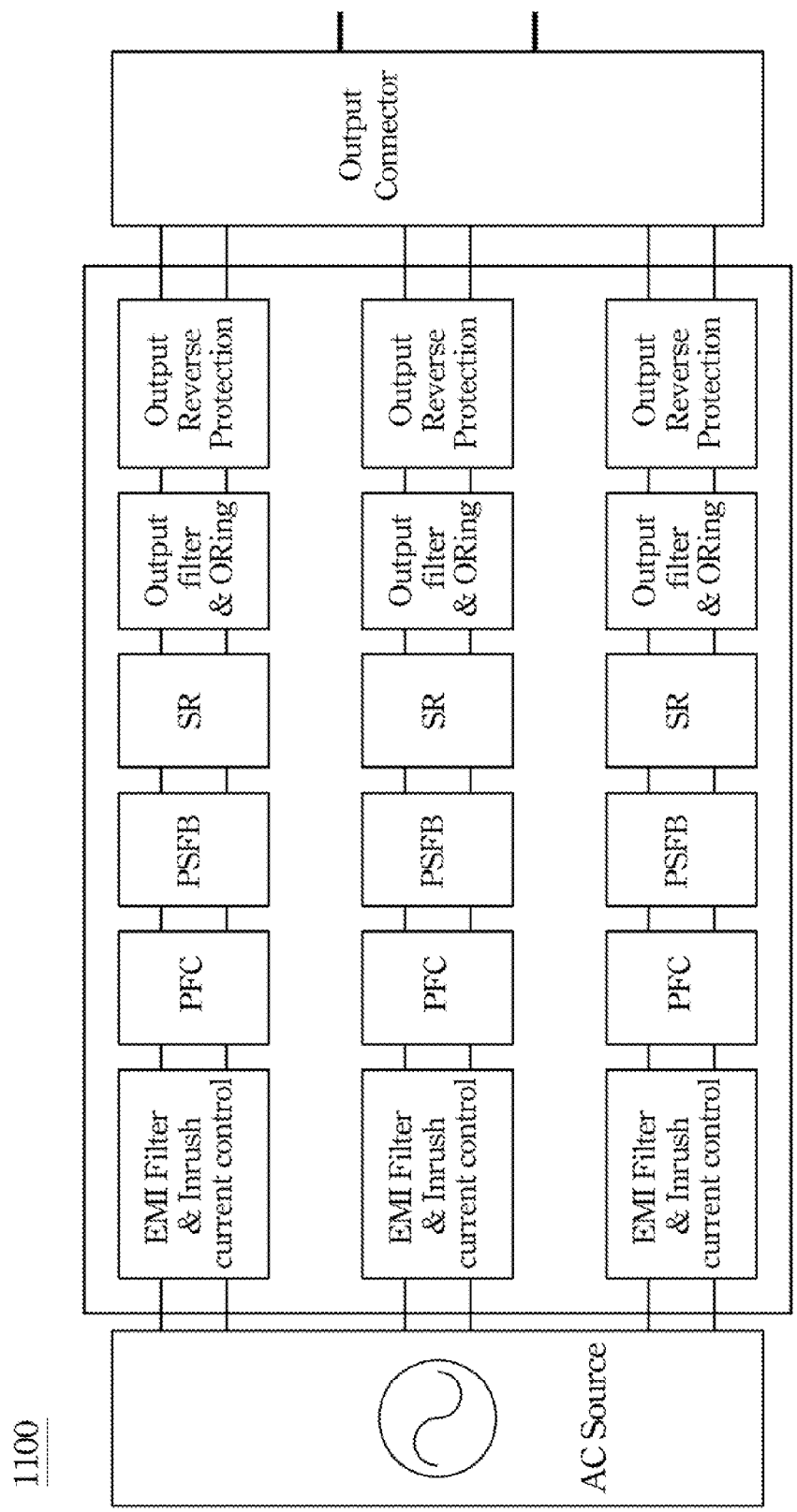
FIG. 11 is a schematic diagram of a power supply apparatus according to a seventh embodiment of the present disclosure.

On the other hand, for applications with AC input, the power supply apparatus includes circuits similar to those illustrated in FIG. 7 except for specific circuits associated with the AC input, despite of a single power source or three separate power source. FIG. 11 is a schematic diagram of a power supply apparatus according to a seventh embodiment of the present disclosure. As illustrated in FIG. 11, the power supply apparatus 1100 has three inputs and three outputs. Compared to FIG. 7, each of the power converters further includes a power factor correction (PFC) circuit for receiving an AC power from the AC source and outputting a DC power.

Similarly, the output connector in the present embodiment can be configured for operatively connecting the outputs of the power converters, such that the power supply apparatus 1100 is able to provide various types of output powers suitable for various requirements of output. For example, assuming that there are three independent power converters and each can provide a power of 12V/100 A, the output connector can be operated to connect the outputs of the three power converters, such that the outputs can be connected in parallel to obtain the power of 12V/300 A, be connected in series to obtain the power of 36V/100 A, or be separate from each other to obtain three separate powers of 12V/100 A.

In still another aspect, a method of generating power by a power supply apparatus is provided. For purposes of clear and convenient illustration, the method is described below in conjunction with the embodiment illustrated in FIG. 4. The method includes the following steps. An input power is converted from the power source 410 into conversion powers by the power converters 420, respectively. After that, the outputs of the power converters 420 are operatively connected and a parallel output power, a serial output power or separate output powers corresponding to the conversion powers is/are outputted from the power converters 420.

In one embodiment, the step of converting the input power into the conversion powers may further include the following steps. First, an input voltage corresponding to the input power is converted (for example, by the converting circuit 422) into a conversion voltage. Afterward, the conversion voltage is rectified (for example, by the rectifier circuit 424). Then, the rectified conversion voltage is filtered and an output voltage is generated (for example, by the output filter circuit 426) as the conversion power.

In another embodiment, the method may further include the following steps described in conjunction with the embodiment illustrated in FIG. 5. Electromagnetic interference is filtered from the input power (for example, by the EMI filter 533). Furthermore, excessive current inrush to the input power is limited (for example, by the inrush current control circuit 535). In addition, energy corresponding to the input power is stored and the input voltage provided to be converted is generated (for example, by the capacitor unit 539).

In still another embodiment, the method may further include the step of clamping the output voltage to an operation voltage (for example, by the output reverse protection circuit 920 shown in FIG. 10) in a condition of the output voltage being a reverse voltage. Specifically, the step of clamping the output voltage to the operation voltage may further include the step of short-circuiting the corresponding output (e.g., PSM2 Output) of the corresponding power converter, such that the output voltage (e.g., Vc) is temporarily clamped to a zero voltage.

The steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A power supply apparatus, comprising:
   a power source;
   a plurality of power converters configured for converting an input power from the power source into conversion powers; and
   an output connector configured for receiving the conversion powers from the power converters and outputting one or more output power corresponding to the conversion powers, wherein at least one of the power converters further comprises:
   a converting circuit configured for converting an input voltage corresponding to the input power into a conversion voltage;
   a rectifier circuit configured for rectifying the conversation voltage;
   an output filter circuit electrically connected across an output of the corresponding power converter, the output filter circuit configured for filtering the rectified conversation voltage and generating an output voltage; and
   an output reverse protection circuit configured for clamping the output voltage to an operation voltage in a condition of the output voltage being a reverse voltage, wherein the output reverse protection circuit is connected across the output of the output filter circuit.

2. The power supply apparatus as claimed in claim 1, wherein the output connector receives the conversion powers from the power converters, such that the outputs of at least two power converters of the power converters are connected in parallel.

3. The power supply apparatus as claimed in claim 1, wherein the output connector receives the conversion powers from the power converters, such that the outputs of at least two power converters of the power converters are connected in series.

4. The power supply apparatus as claimed in claim 1, wherein the output connector receives the conversion powers from the power converters, such that the output of at least one power converter of the power converters is separately outputted.

5. The power supply apparatus as claimed in claim 1, wherein the power source further comprises:
   a direct-current power source configured for providing a direct-current power for the power converters.

6. The power supply apparatus as claimed in claim 5, wherein at least one of the power converters comprises:
   a DC/DC converter configured for converting the direct-current power into the corresponding conversion power.

7. The power supply apparatus as claimed in claim 1, wherein the power source further comprises:
   an alternating-current power source configured for providing an alternating-current power for the power converters.

8. The power supply apparatus as claimed in claim 7, wherein at least one of the power converters further comprises:
   a power factor correction circuit configured for receiving the alternating-current power and outputting a direct-current power; and
   a DC/DC converter configured for converting the direct-current power into the corresponding conversion power.

9. The power supply apparatus as claimed in claim 1, wherein the output reverse protection circuit further comprises a diode device or a transistor device electrically connected across the output of the output filter circuit.

10. The power supply apparatus as claimed in claim 1, further comprising:
    a control circuit configured for activating the output reverse protection circuit in response to the reverse voltage.

11. The power supply apparatus as claimed in claim 10, wherein the control circuit further comprises:
    a transistor device configured to receive a driving voltage and to be switched off in response to the reverse voltage such that the output reverse protection circuit is activated by the driving voltage to clamp the output voltage to the operation voltage.

12. The power supply apparatus as claimed in claim 1, wherein at least one of the power converters further comprises:
an EMI filter circuit configured for filtering electromagnetic interference from the input power generated from the power source;
an inrush control circuit configured for limiting excessive current inrush to the input power; and
a capacitor unit configured for storing energy corresponding to the input power and generating the input voltage provided for the converting circuit.

13. A power supply apparatus, comprising:
a power source;
a plurality of power converters electrically connected to the power source; and
an output connector configured for operatively connecting outputs of the power converters, such that the outputs of at least two power converters of the power converters are electrically connected in parallel or in series, or the output of at least one power converter of the power converters is separately outputted, wherein at least one of the power converters further comprises:
a converting circuit electrically connected to the power source;
an output filter circuit electrically connected across an output of the corresponding power converter; and
an output reverse protection circuit configured for clamping an output of the output filter circuit in a condition of the output filter circuit generating a reverse voltage, wherein the output reverse protection circuit is connected across the output of the output filter circuit.

14. The power supply apparatus as claimed in claim 13, wherein the output reverse protection circuit further comprises:
a first transistor device electrically connected across the output of output filter circuit.

15. The power supply apparatus as claimed in claim 14, further comprising:
a control circuit configured for switching on the first transistor device in response to the reverse voltage.

16. The power supply apparatus as claimed in claim 15, wherein the control circuit further comprises:

a second transistor device having a first terminal electrically connected to a control terminal of the first transistor device and a driving source, a second terminal electrically connected to a first terminal of the first transistor device and the driving source, and a control terminal electrically connected to a second terminal of the first transistor device and the driving source.

17. A method of generating power by a power supply apparatus, the method comprising:
converting an input power from a power source into conversion powers by a plurality of power converters, respectively; and
operatively connecting outputs of the power converters, such that the outputs of at least two power converters of the power converters are electrically connected in parallel or series, or the output of at least one power converter of the power converters is separately outputted, wherein the step of converting the input power into the conversion powers further comprises;
converting an input voltage corresponding to the input power into a conversion voltage by a converting circuit electrically connected to the power source:
rectifying the conversion voltage by a rectifier circuit:
filtering the rectified conversion voltage and generating an output voltage as the conversion power by an output filter circuit; and
clamping the output voltage to an operation voltage in a condition of the output voltage being a reverse voltage by an output reverse protection circuit, wherein the output reverse protection circuit is connected across the output of the output filter circuit.

18. The method as claimed in claim 17, wherein the step of clamping the output voltage to the operation voltage further comprises:
short-circuiting the corresponding output of the corresponding power converter such that the output voltage is temporarily clamped to a zero voltage.

19. The method as claimed in claim 17, further comprising:
filtering electromagnetic interference from the input power;
limiting excessive current inrush to the input power; and
storing energy corresponding to the input power and generating the input voltage to be converted.

* * * * *